United States Patent [19]

Nakagawa et al.

[11] Patent Number: 5,027,385
[45] Date of Patent: Jun. 25, 1991

[54] FACSIMILE APPARATUS FOR COMMUNICATING ON EXTERNAL AND INTERNAL TELEPHONE SETS

[75] Inventors: Hidetoshi Nakagawa; Keiji Kawano, both of Kanagawa; Masakatu Miyazaki, Saitama, all of Japan

[73] Assignee: Tamura Electric Works, Ltd., Japan

[21] Appl. No.: 416,364

[22] Filed: Sep. 25, 1989

[30] Foreign Application Priority Data

Sep. 26, 1988 [JP] Japan .............................. 63-238856

[51] Int. Cl.⁵ ............................................. H04M 1/32
[52] U.S. Cl. .................................... 379/100; 379/212
[58] Field of Search ...................... 379/100, 90, 96–98, 379/159, 160, 167, 201, 210, 212

[56] References Cited

U.S. PATENT DOCUMENTS 4,825,461 4/1989 Kurita et al. ......................... 379/100

Primary Examiner—Jin F. Ng
Assistant Examiner—Wing F. Chan
Attorney, Agent, or Firm—Remy J. VanOphem

[57] ABSTRACT

A facsimile apparatus selectively connecting an office line together with an external telephone set having a ring tone generator and is constituted by an internal telephone set and a facsimile main body, includes an extension channel, an office line channel, a call key, a call signal generator, first to third switches, and a controller. The extension channel connects the external and internal telephone sets to each other. The office line channel connects the external and internal telephone sets to the office line. The call key is used to call the external telephone set. The call signal generator outputs a call signal to the ring tone generator. The first switch switches the office line to one of the facsimile main body and the office line channel. The second switch normally connects the internal telephone set to the office line channel. The third switch normally connects the external telephone set to the extension channel and switches the external telephone set to the office line channel in accordance with an office line outgoing call request and an office incoming call of the external telephone set. The controller controls the second switch to switch the internal telephone set from the office line channel side to the extension channel side in accordance with depression of the call key and an off-hook operation of internal telephone set, and controls the call signal generator to output a call signal to the ring tone generator in accordance with depression of the call key and the off-hook operation. A channel is formed between the external and internal telephone sets by setting the external telephone set in an off-hook state in response to the call signal.

3 Claims, 9 Drawing Sheets

FACSIMILE APPARATUS FOR COMMUNICATING ON EXTERNAL AND INTERNAL TELEPHONE SETS

BACKGROUND OF THE INVENTION

The present invention relates to a facsimile apparatus which is selectively connected to an office line together with an external telephone set and is constituted by an internal telephone set and a facsimile main body.

A conventional facsimile apparatus includes an internal telephone set and allows a telephone set (external telephone set) to be independently attached to an external terminal formed on its main body.

More specifically, in such an apparatus, external and internal telephone sets are branch-connected to an office line so that an outgoing call to the office line and an incoming call from the office line can be made by both the internal and external telephone sets.

A privacy function normally acts between such internal and external telephone sets. That is, in calling to and from the office line, priority of using a telephone line is given to one of the internal and external telephone sets whose handset is set in an off-hook state first, and a privacy state with respect to the other telephone set is assured.

In such a conventional facsimile apparatus, however, since a privacy function acts between the internal and external telephone sets, extension speech communication between these telephone sets cannot be performed.

SUMMARY OF THE INVENTION

It is, therefore, a principal object of the present invention to provide a facsimile apparatus which can form a channel between external and internal telephone sets.

It is another object of the present invention to provide a facsimile apparatus which allows extension speech communication between internal and external telephone sets.

It is still another object of the present invention to provide a facsimile apparatus which allows an external telephone set to perform transfer of an incoming call based on facsimile communication, i.e., a remote incoming call.

In order to achieve the above objects, according to the present invention, there is provided a facsimile apparatus which is selectively connected to an office line together with an external telephone set having a ring back tone generator and is constituted by an internal telephone set and a facsimile main body. The apparatus includes an extension channel for connecting the external and internal telephone sets to each other, an office line channel for connecting the external and internal telephone sets to the office line, a call key for calling the external telephone set, a call signal generator for outputting a call signal to the ring back tone generator, first switching means for switching the office line to one of the facsimile main body and the office line channel, second switching means for normally connecting the internal telephone set to the office line channel, third switching means for normally connecting the external telephone set to the extension channel and switching the external telephone set to the office line channel in accordance with an office line outgoing call request and an office incoming call of the external telephone set, and a control section for controlling the second switching means so as to switch the internal telephone set from the office line channel side to the extension channel side in accordance with depression of the call key and an off-hook operation of the internal telephone set and for controlling the call signal generator so as to output a call signal to the ring back tone generator in accordance with depression of the call key and the off-hook operation, wherein a channel is formed between the external and internal telephone sets by setting the external telephone set in an off-hook state in response to the call signal.

According to the first aspect of the present invention, in accordance with depression of the call key and an off-hook operation of the internal telephone set, the internal telephone set is switched to the extension channel side to call the external telephone set. If the external telephone set is set in an off-hook state in response to this call, a channel is formed between the external and internal telephone sets.

According to the second aspect of the present invention, in accordance with a calling operation of the external telephone set with respect to the internal telephone set, the internal telephone set is switched to the extension channel side to be called. If the internal telephone set is set in an off-hook state, a channel is formed between the internal and external telephone sets.

According to the third aspect of the present invention, upon detection of a dial signal which is output on the basis of the dial key operated in accordance with a calling operation of the external telephone set with respect to the internal telephone set, the internal telephone set is switched to the extension channel side. In addition, upon detection of a dial signal which is output on the basis of the dial key operated in accordance with transfer of an office line incoming call based on facsimile communication from the external telephone set to the facsimile main body, the office line is switched to be connected to the facsimile body.

DETAILED DESCRIPTION OF THE PREFERRED EMBODIMENTS

A facsimile apparatus according to the present invention will be described in detail below.

Figure 8:
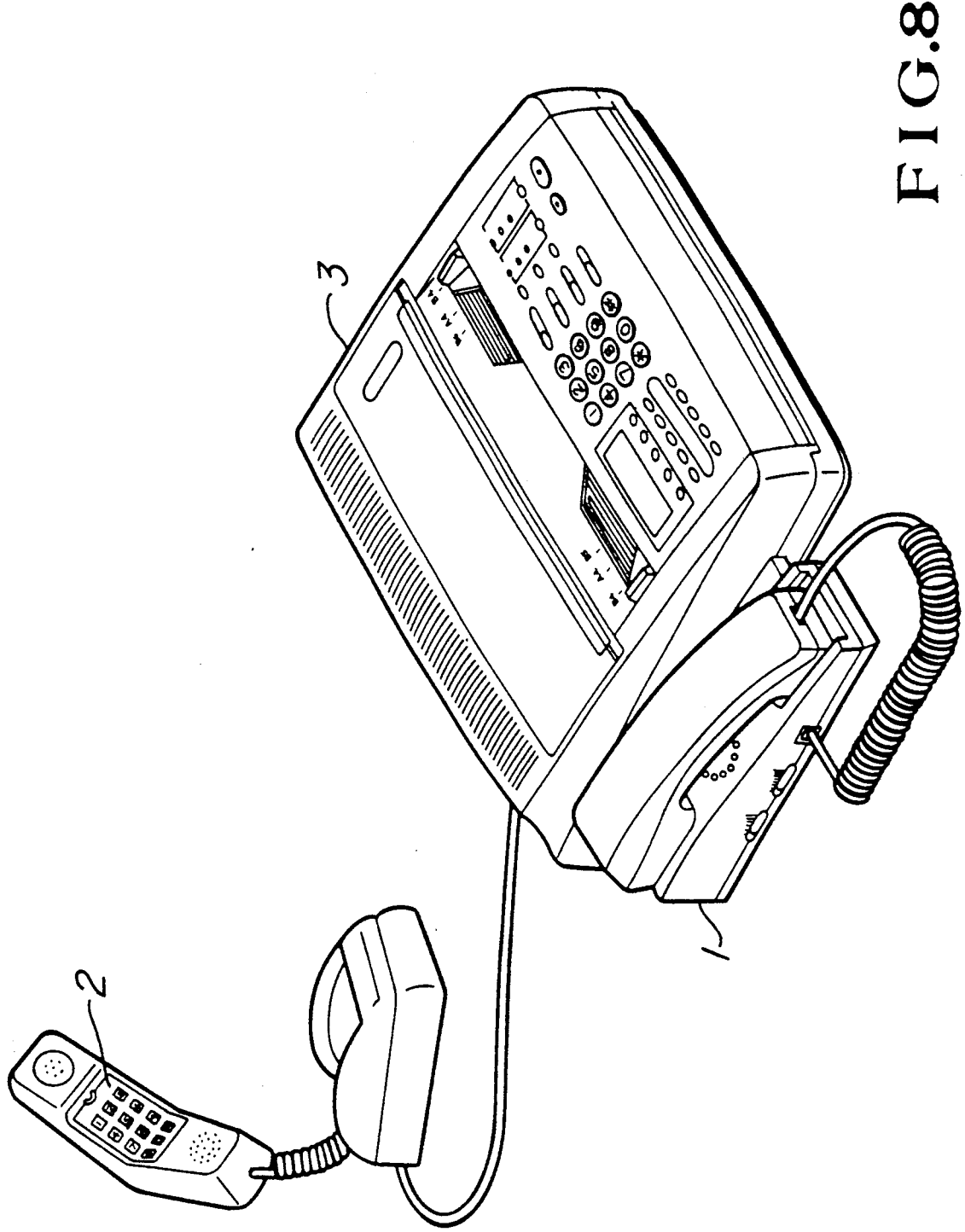
FIG. 8 is a perspective view showing a system arrangement of the facsimile apparatus.

FIG. 8 shows a system arrangement of a facsimile apparatus according to an embodiment of the present invention. Referring to FIG. 8, reference numeral 1 denotes an internal telephone set (to be referred to as an internal TEL hereinafter) incorporated in a facsimile main body 3; and 2, an external telephone set (to be referred to as an external TEL hereinafter) installed in, e.g., a room other than the room where the facsimile main body 3 is installed.

Figure 1:
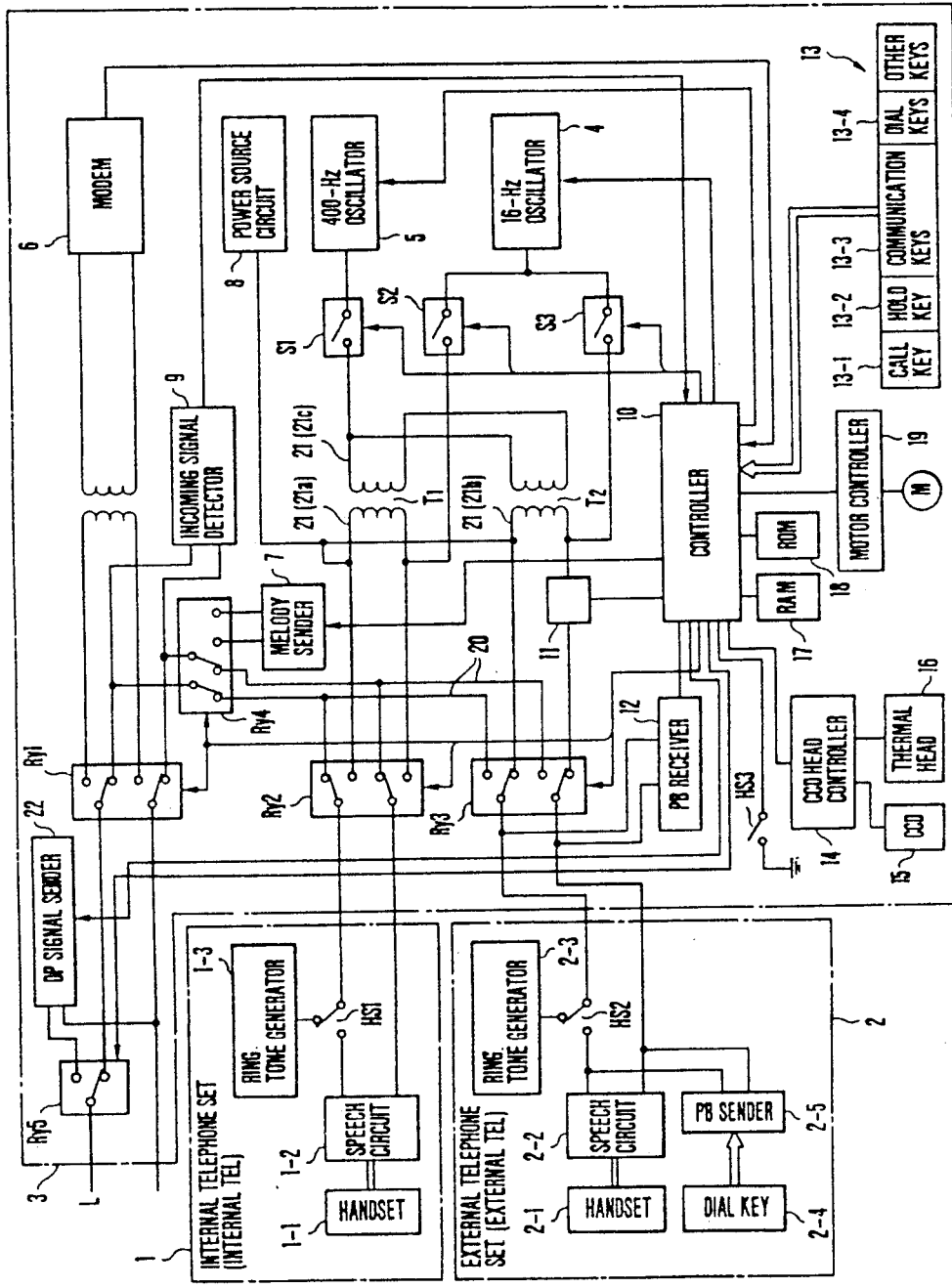
FIG. 1 is a block diagram showing a circuit arrangement of a facsimile apparatus according to an embodiment of the present invention.

FIG. 1 shows an arrangement of the facsimile apparatus. Referring to FIG. 1, the internal TEL 1 has a handset 1-1, a speech circuit 1-2, a ring tone generator 1-3, and a hook switch HS1. The external TEL 2 has a handset 2-1, a speech circuit 2-2, a ring tone generator 2-3, a dial key 2-4, a PB sender 2-5, and a hook switch HS2. In the facsimile main body 3, reference numeral 4 denotes a 16-Hz oscillator for generating a 16-Hz call signal; 5, a 400-Hz oscillator for generating tone signals such as a ring back tone, a busy tone, and a dial tone; 6, a modem for demodulating an image signal received through an office line L and for modulating an image signal read by a CCD 15 (to be described later); Ry1, a first relay for switching the office line to either a telephone line (to be referred to as an office line channel) 20 to the internal and external TELs 1 and 2 side through a relay Ry4 (to be described later) or the modem 6 Ry2, a second relay for switching the internal TEL 1 either office line channel 20 or telephone line (to be generally referred to as extension channels 21 and to be specifically referred to as extension channels 21$a$, 21$b$, and 21$c$ hereinafter) to the external TEL 2 side through transformers T$_1$ and T$_2$; Ry3, a third relay for switching the external TEL 2 to one of the office line channel 20 and the extension channel 21; Ry4, a fourth relay for switching the office line to one of a melody sender 7 and the office line channel 20; Ry5, a fifth relay for switching the office line L to one of a DP signal sender 22 and the relay Ry1; 8, a power source circuit for applying a voltage to the extension channels 21; S1, a switch for supplying a tone signal output from the 400-Hz oscillator 5 to one of the internal and external TELs 1 and 2 through the extension channels 21$c$-21$a$ or 21$c$-21$b$; S2, a switch for supplying a call signal output from the 16-Hz oscillator 4 to the ring tone generator 1-3 of the internal TEL 1 through the extension channel 21$a$; S3, a switch for supplying a call signal output from the 16-Hz oscillator 4 to the ring tone generator 2-3 of the external TEL 2 through the extension channel 21$b$; 9, an incoming signal detector for detecting a 16-Hz incoming signal supplied from the office line through the relay Ry1; and 10, a controller for controlling the respective components. In addition, reference numeral 11 denotes a DC loop detector for detecting a DC loop of transformer T$_2$ - relay Ry3 -hook switch HS2 - speech circuit 2-2 - handset 2-1 which is formed when the hook switch HS2 is switched to the speech circuit 2-2 in accordance with an off-hook operation of the external TEL 2; 12, a PB receiver for detecting a PB signal sent from the PB sender 2-5 in accordance with an operation of the dial key 2-4 of the external TEL 2; 13, an operation section constituted by a call key 13-1 to be operated to call the external TEL 2, a hold key 13-2, a communication key 13-3 to be operated for facsimile communication, a dial key 13-4, and the like; 14, a CCD head controller for controlling the CCD 15 and a thermal head 16; 17, a RAM; 18, a ROM; 19, a motor controller for controlling a motor M; HS3, a hook switch to be operated in response to an operation of the hook switch HS1; and 22, a DP signal sender, controlled by the controller 10 which receives a dial signal corresponding to the dial key 13-4 operated in the operation section 13, for sending a dial pulse signal.

The relays Ry1 to Ry5 and the switches S1 to S3 are controlled by the controller 10. The switching state shown in FIG. 1 is the initial set state of each of the relays and the switches. More specifially, while the switches S1 to S3 are set in the OFF state, the relays Ry1 and Ry2 are connected to the office line channel 20 side; the relay Ry3, to the extension channel 21 side; the relay Ry4, to the office line channel 20 side; and the relay Ry5, to the relay Ry1 side. This connection state is assumed to be the initial state. In addition, the 16-Hz and 40-Hz oscillators 4 and 5 are controlled by the controller 10. Upon reception of image data obtained by demodulating an image signal received from the office line L by using the modem 6, the controller 10 controls the CCD head controller 14 to record the image data on recording paper using the thermal head 16. Also, the controller 10 supplies an image signal read from a transmission document by means of the CCD 15 to the modem 6 so as to modulate the image signal, and outputs the modulated signal to the office line L. When the content of a key operation in the operation section 13 is recognized by the controller 10, and the handset 1-1 of the internal TEL 1 is set in an off-hook state, the hook switch HS3 is turned on in response to the operation of the hook switch HS1. The controller 10 recognizes the off-hook state of the internal TEL 1 on the basis of the ON state of the hook switch HS3. When the handset 2-1 of the external TEL 2 is set in an off-hook state, the hook switch HS2 is switched to the speech circuit 2-2 side to form a closed loop between the extension channel 21$b$ and the external TEL 2, and a current flows in accordance with a voltage applied from the power source circuit 8 to this closed loop. The controller 10 recognizes the off-hook state of the external TEL 2 in accordance with a detection output from the DC loop detector 11 which detects this current. Since the PB receiver 12 is kept connected to the extension channel 21$b$, the controller 10 recognizes the content of an operation of the dial key 2-4 of the external TEL 2 in accordance with a detection output from the PB receiver 12. In addition, the controller 10 recognizes an incoming call from the office line in accordance with a detection output from the incoming signal detector 9.

The controller 10 controls the relays Ry2 and Ry3 so as to allow a privacy function to act between the internal and external TELs 1 and 2. More specifically, in calling to and from the office line, priority of using a telephone line is given to one of the internal and external TELs 1 and 2 whose handset is set in an off-hook state first, and a privacy state with respect to the other is assured. When an incoming call from the office line L is received, the relay Ry3 is connected to the office line channel 20 side and the incoming call is simultaneously supplied to the internal and external TELs 1 and 2 in the initial state shown in FIG. 1.

Figure 7:
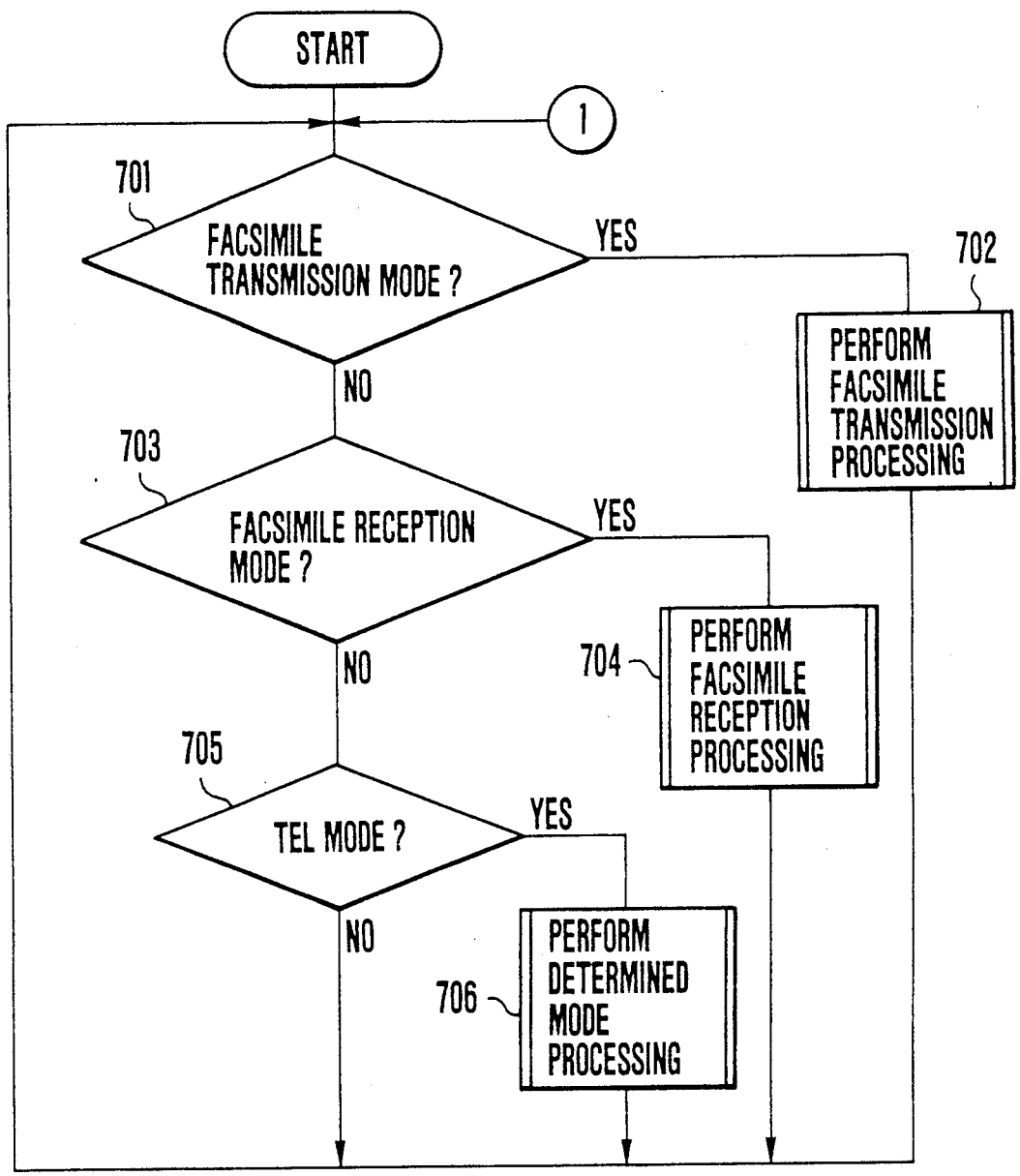
FIG. 7 is a flow chart showing a fundamental operation of the facsimile apparatus.

A fundamental operation of the facsimile apparatus will be described below with reference to a flow chart in FIG. 7.

It is checked whether a facsimile transmission mode is set or not (step 701). The facsimile transmission mode is determined if the internal TEL 1 is in an off-hook state, a dial signal is output, and the communication key 13-3 is depressed. More specifically, the off-hook state of the internal TEL 1 is detected from an ON state of the hook switch HS3. When the dial key 13-4 in the operation section 13 is subsequently depressed, if a DP signal is to be output as a dial signal, the relay Ry5 is controlled to switch the office line L to the DP signal sender 22 side. As a result, the DP signal sender 22 sends a DP signal to the office line L by intermittently connecting a DC loop constituted by the office line L, the relay Ry5, and the DP signal sender 22 in accordance with the depressed dial key 13-4. If a PB signal is to be sent as a dial pulse, the relay Ry1 is controlled to switch the office line L to the modem 6 side so as to send a PB signal formed by the modem 6 to the office line L. Thereafter, when a carrier is output from a facsimile apparatus on the destination side and the communication key is depressed, the facsimile transmission mode is determined (step 701). Hence, facsimile transmission processing is performed (step 702). More specifically, the CCD 15 is controlled by the CCD head controller 14 to read a transmission document, and the read image signal is supplied to the modem 6 to be modulated. The modulated signal is then output to the office line L through the relays Ry1 and Ry5.

If NO in step 701, it is checked whether the facsimile reception mode is set or not (step 703). The facsimile reception mode is determined if, for example, the internal TEL 1 is set in an off-hook state and the communication key 13-3 is depressed upon detection of an incoming call. More specifically, an incoming call is detected in accordance with an output from the incoming signal detector 9, and the off-hook state of the internal TEL 1 is detected in accordance with the ON state of the hook switch HS3 interlocked with the hook switch HS1. Subsequently, if depression of the communication key 13-3 in the operation section 13 is detected, the facsimile reception mode is determined (step 703). Hence, facsimile reception processing is performed (step 704). More specifically, the relay Ry1 is controlled to switch the office line L to the facsimile main body side, i.e., the modem 6 side, so that an image signal received from the office line L is demodulated by the modem 6 and output to the controller 10. As a result, an image based on the demodulated signal is recorded on recording paper by means of the thermal head 16 controlled by the CCD head controller 14.

The facsimile reception mode may be determined in accordance with conditions other than those described above as follows. If the external TEL 2 is set in an off-hook state in response to an incoming call, and the incoming call is based on facsimile communication, the facsimile reception mode is determined upon detection of a dial operation of the external TEL 2 corresponding to incoming call transfer (remote incoming call) for facsimile communication. This remote incoming call will be described later.

If NO in step 703, it is checked whether a TEL mode is set or not (step 705). This determination is made in accordance with flow charts shown in FIGS. 2 to 6. If any mode is determined, processing for the determined mode is performed (step 706). If NO in step 705, the flow returns to step 701 again to repeat the above-described determination and processing.

Figure 2:
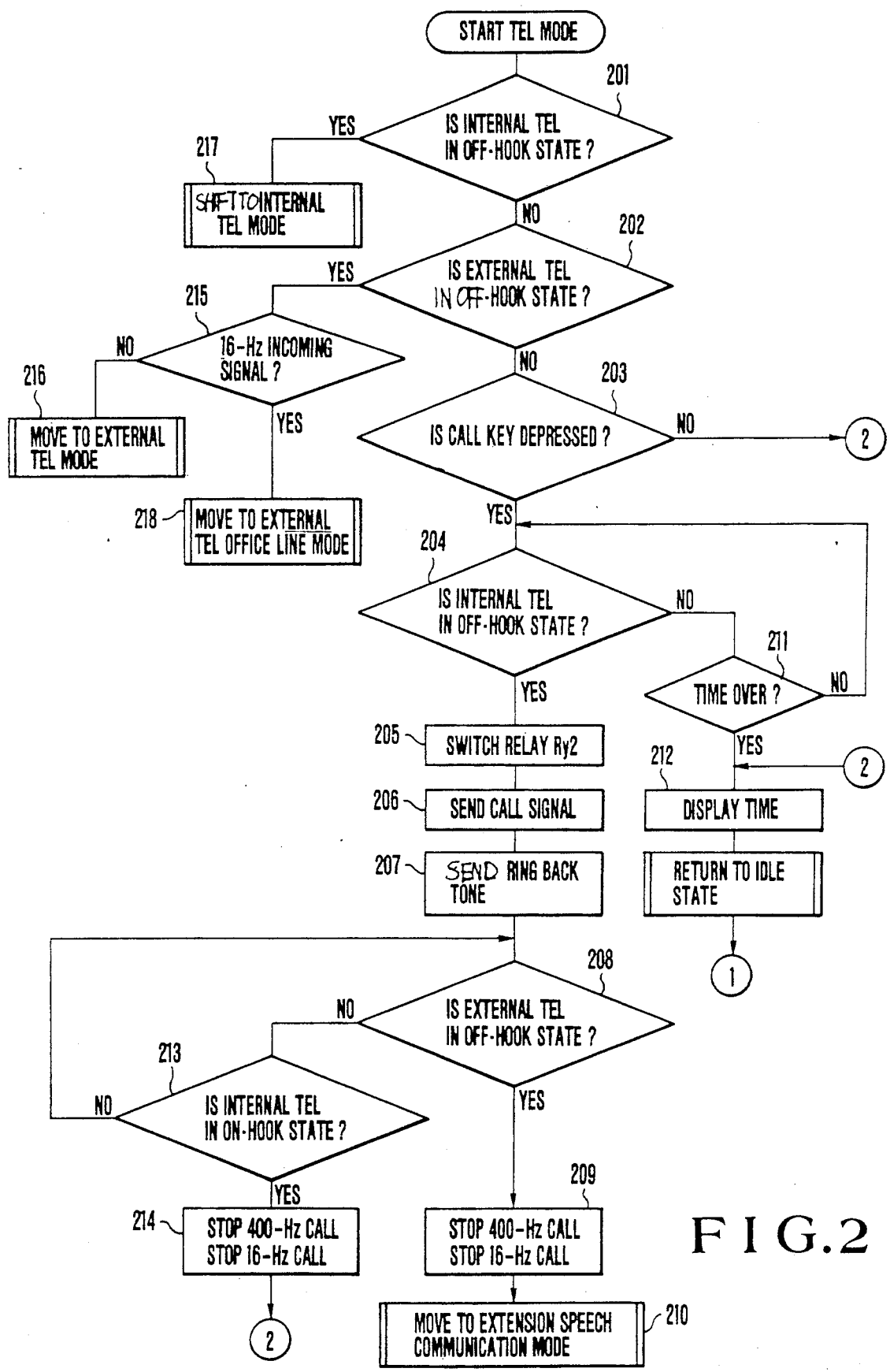
FIG. 2 is a flow chart, showing a "TEL mode", for explaining an operation of the facsimile apparatus.

The TEL mode will be described below with reference to the flow chart in FIG. 2.

If the call key 13-1 of the operation section 13 is depressed and the handset 1-1 of the internal TEL 1 is set in an off-hook state following the depression of the call key 13-1 in the initial state shown in FIG. 1, a depression output from the call key 13-1 and an off-hook output from the internal TEL 1 are recognized by the controller 10 (steps 203 and 204), and an extension speech communication mode is determined. Hence, extension speech communication processing is performed. More specifically, the relay Ry2 is switched to the extension channel 21a side (step 205). The controller 10 turns on the switch S3, and controls the 16-Hz oscillator 4 so as to supply a call signal to the ring tone generator 2-3 of the external TEL 2 through the extension channel 21b and the relay Ry3 (step 206). Meanwhile, the controller 10 turns on the switch S1, and controls the 400-Hz oscillator 5 so as to supply a ring back tone to the internal TEL 1 through the extension channel 21a and the relay Ry2 (step 207). The ring tone generator 2-3 generates a ring back tone on the basis of the supplied call signal. If the external TEL 2 is set in an off-hook state in response to this ring tone, the hook switch HS2 is turned on. As a result, the extension channel 21 is formed, and a current flows in accordance with a voltage applied from the power source circuit 8. The controller 10 recognizes the off-hook state of the external TEL 2 in accordance with a detection output from the DC loop detector 11 which detects this current. If the off-hook state of the external TEL 2 is recognized (step 208), the controller 10 determines that a channel is formed between the internal and external TELs 1 and 2. As a result, the controller 10 turns off the switches S1 and S3 to stop supply of the ring back tone to the internal TEL 1 and of the call signal to the external TEL 2 (step 209), and shifts to the extension speech communication mode (step 210), thereby enabling extension speech communication between the internal and external TELs 1 and 2.

If the call key 13-1 is depressed but the internal TEL 1 is not set in an off-hook state in step 204, the controller 10 determines an idle mode upon completion of counting by means of a soft timer (1-minute timer) in step 211, and performs "time display" in step 212, and shifts to an idle state. Subsequently, the flow returns to step 701 in FIG. 7 so as to repeat the determination and processing from the beginning. In addition, if a call signal is supplied to the external TEL 2 to ring but the external TEL 2 is not set in an off-hook state in step 208, the controller 10 determines the idle mode upon confirmation of the on-hook state of the internal TEL 1 in step 213. As a result, the controller 10 stops supply of the ring back tone to the internal TEL 1 and of the call signal to the external TEL 2 (step 214), and shifts to an idle state through step 212.

Extension calling (internal TEL calling) from the external TEL 2 to the internal TEL 1 will be described below.

Figure 3:
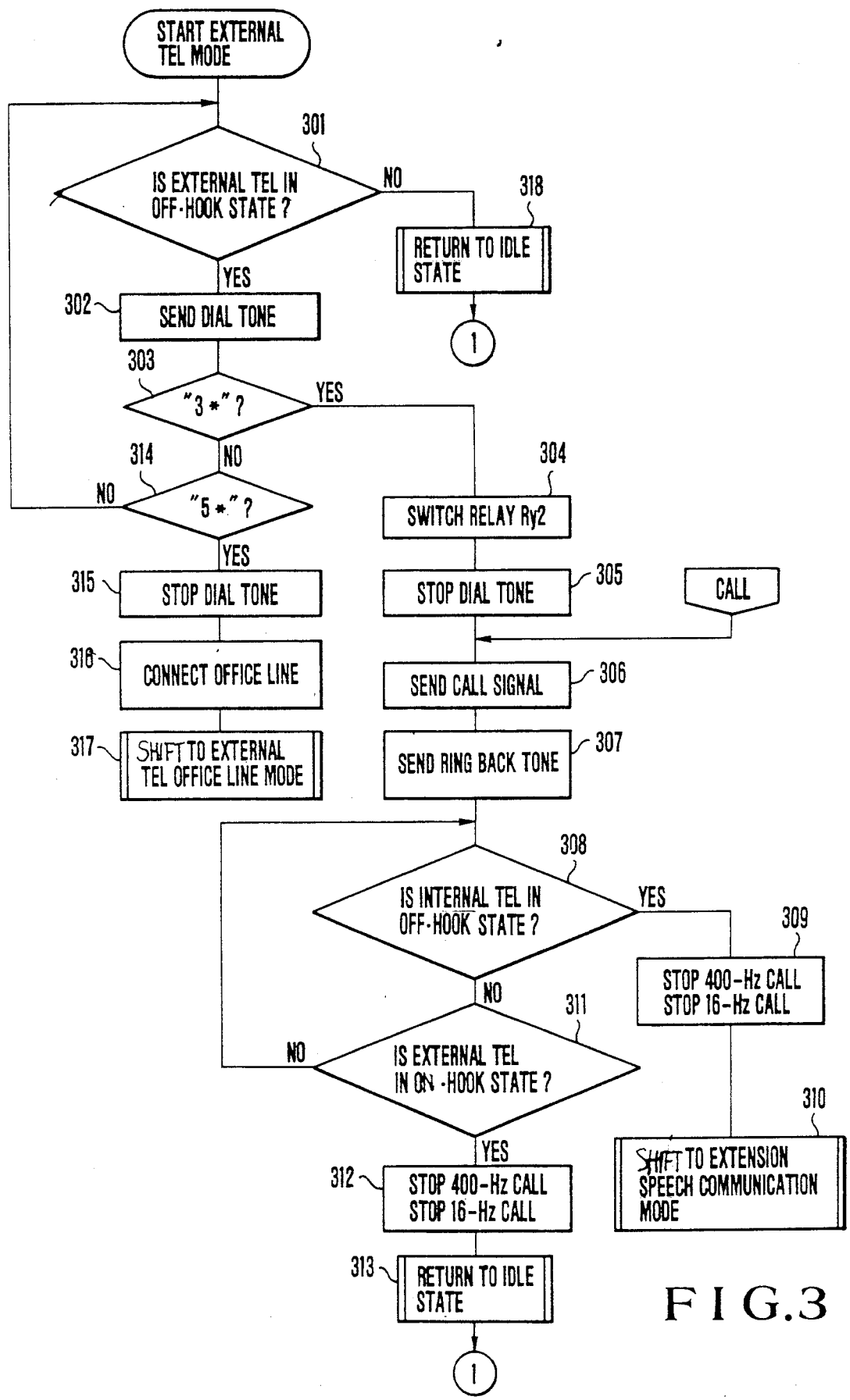
FIG. 3 is a flow chart showing an "external TEL mode"

If the external TEL 2 is set in an off-hook state in the initial state shown in FIG. 1, the controller 10 recognizes the off-hook state of the external TEL 2 in accordance with an output from the DC loop detector 11 in the above-described manner (step 202). After the controller 10 recognizes that the external TEL 2 is not set in an off-hook state in response to an incoming signal from the office line L (step 215), the flow advances to step 216, i.e., an "external TEL mode". FIG. 3 shows this "external TEL mode". Upon confirmation of the off-hook state of the external TEL 2 on the basis of an output from the DC loop detector 11 in the above-described manner in step 301, the controller 10 turns on the switch S1 to supply a dial tone from the 400-Hz oscillator 5 to the external TEL 2 through the extension channels 21c and 21b and the relay Ry3 (step 302). If a "3*key" is depressed using the dial key 2-4 of the external TEL 2 in this state, a PB signal based on the "3*key" is recognized by the controller 10 through the PB receiver 12 (step 303), and an extension communication mode is detected. Hence, extension speech communication processing is performed. That is, the relay Ry2 is switched to the extension channel 21a side (step 304). Subsequently, the controller 10 turns off the switch S1 to interrupt supply of the dial tone to the external TEL 2 (step 305), and turns on the switch S2 to control the 16-Hz oscillator 4, thus supplying a call signal to the ring tone generator 1-3 of the internal TEL 1 through the extension channel 21a and the relay Ry2 (step 306). At the same time, the controller 10 turns on the switch S1 and controls the 400-Hz oscillator 5 so as to supply a ring back tone to the external TEL 2 through the extension channels 21c and 21b and the relay Ry3 (step 307). Upon reception of the call signal, the ring tone generator 1-3 generates a ring tone. If the internal TEL 1 is set in an off-hook state in response to this ring tone, the hook switch HS3 is turned on in response to switching of the hook switch HS1 to the speech circuit 1-2, and the off-hook state of the internal TEL 1 is recognized by the controller 10 (step 308). The controller 10 determines that a channel is formed between the internal and external TELs 1 and 2. As a result, the controller 10 turns off the switches S1 and S3 so as to stop supply of the ring back tone to the external TEL 2 and of the call signal to the internal TEL 1 (step 309), and shifts to the extension speech communication mode (step 310), thereby enabling extension speech communication between the internal and external TELs 1 and 2.

If the external TEL 2 is set in an on-hook state in step 301, the controller 10 determines the idle mode and shifts to the idle state. If a call signal is supplied to the internal TEL 1 to ring but the internal TEL 1 is not set in an off-hook state in step 308, the controller 10 determines the idle mode upon confirmation of the on-hook state of the external TEL 2 in step 311, and stops supply of the ring back tone to the external TEL 2 and of the call signal to the internal TEL 1 (step 312). Subsequently, the controller 10 returns to the idle state. In addition, if a "5*key" is depressed using the dial key 2-4 of the external TEL 2 in place of the "3*key", and the controller 10 recognizes the depression of the "5*key" through the PB receiver 12 (step 314), an external TEL office line mode is determined. Hence, processing for the external TEL office line mode is performed. More specifically, the controller 10 turns off the switch S1 to interrupt supply of the dial tone to the external TEL 2 (step 315), and switches the relay Ry3 to the office line channel 20 side so as to form a DC loop of the external TEL 2 and the office line L. At the same time, the controller 10 switches the relay Ry2 to the extension channel 21a side to connect the external TEL 2 to the office line L in a privacy state with respect to the internal TEL 1 (step 316), and shifts to the "external TEL office line mode" (step 317), thus enabling office line speech communication from the external TEL 2.

An office line transfer operation from the internal TEL 1 to the external TEL 2 will be described below.

Figure 4:
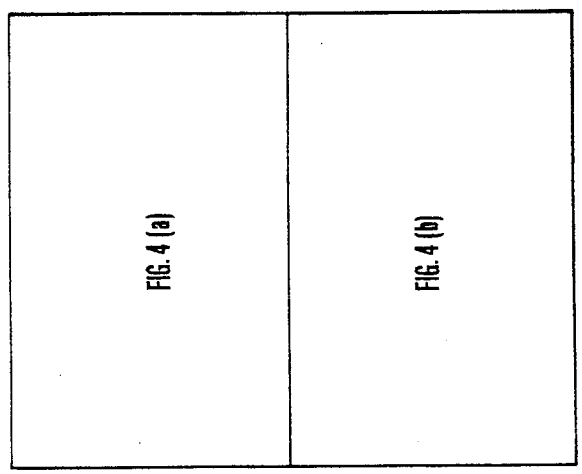
FIG. 4 shows the relationship between FIGS. 4a and 4b.
Figure 4A:
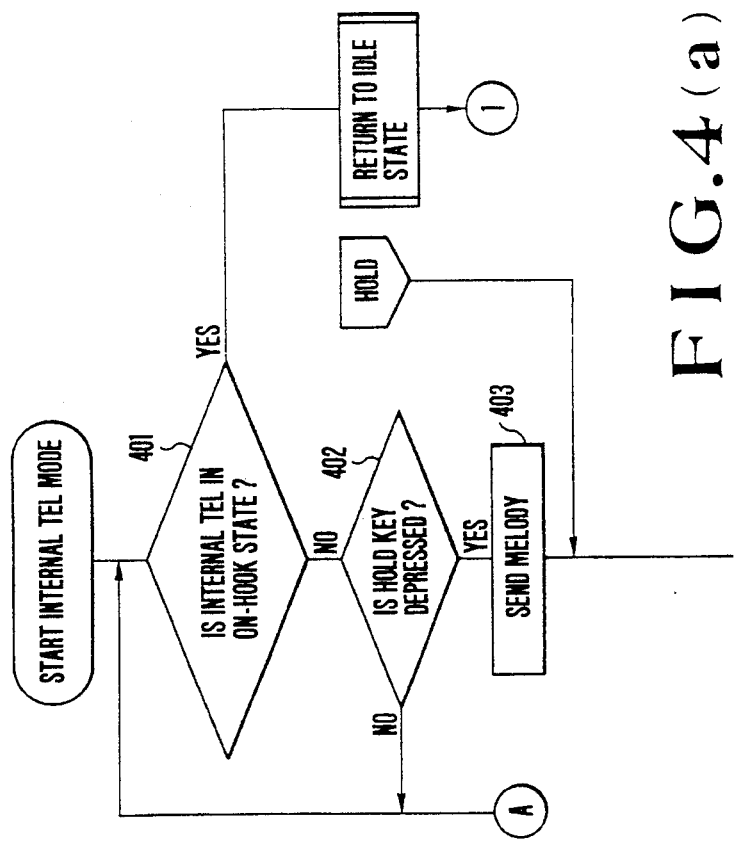
FIGS. 4a, 4b are flow chart showing an "internal TEL mode"
Figure 4B:
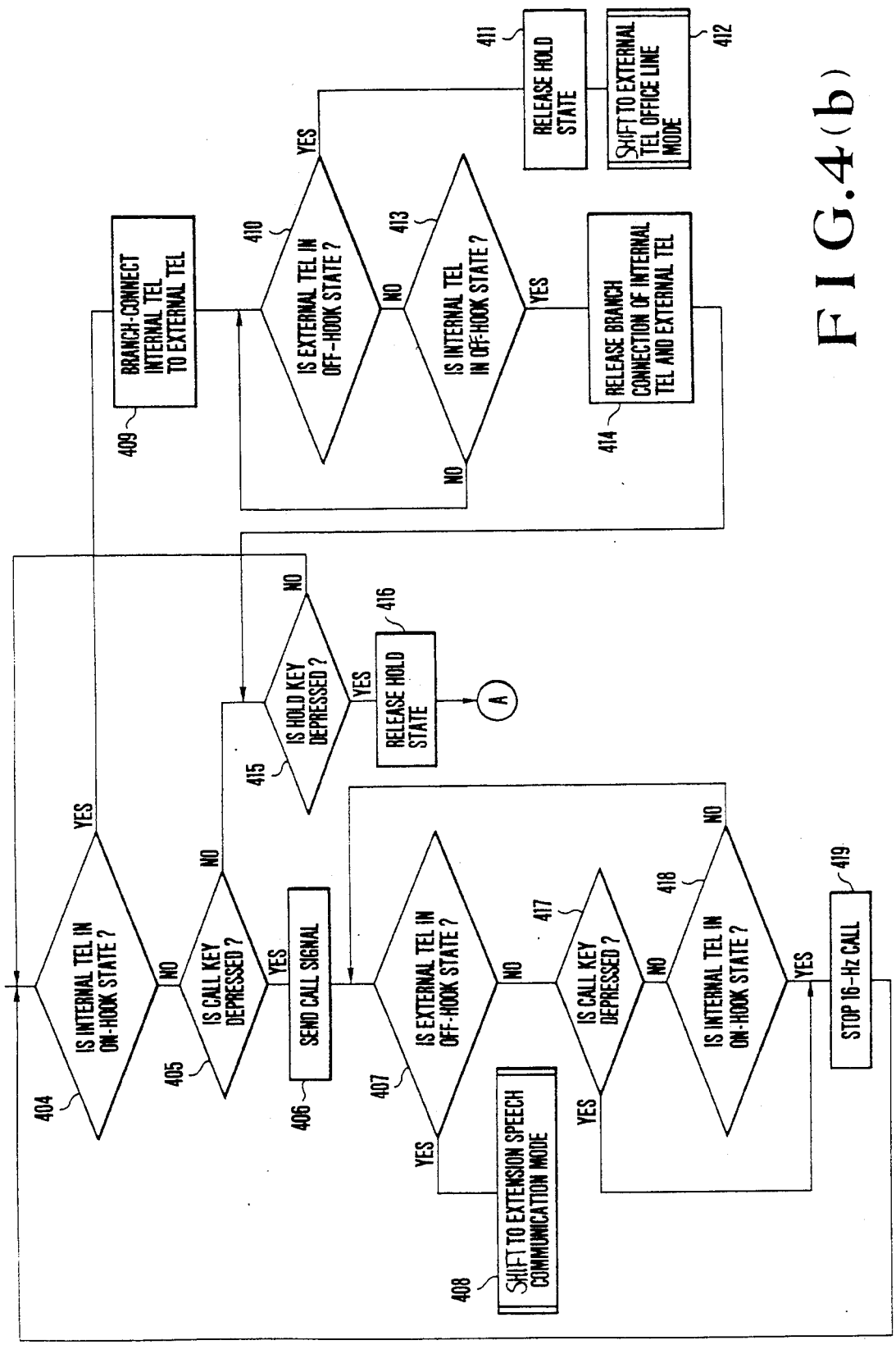

If the internal TEL 1 is set in an off-hook state in accordance with an outgoing call to the office line L or an incoming call from the office line L in the initial state shown in FIG. 1, the off-hook state of the internal TEL 1 is recognized by the controller 10 in accordance with an output from the hook switch HS3 in the above-described manner (step 201). The controller 10 determines an "internal TEL mode" to be processed in step 217, and the flow advances to internal TEL processing to enable speech communication between the internal TEL 1 and the office line L. When the office line L is to be transferred to the external TEL 2 during office line speech communication by means of the internal TEL 1, the hold key 13-2 in the operation section 13 is depressed. FIG. 4 shows an office line transfer operation from the TEL 1 to the external TEL 2 in detail. If the hold key 13-2 is depressed while the internal TEL 1 is in an off-hook state, the controller 10 recognizes the depression of the hold key 13-2 in step 402 upon confirmation of the off-hook state of the internal TEL 1 in step 401. Then, the controller 10 controls the relay Ry4 to switch the office line L to the melody sender 7 side so as to send a melody to the office line L using the melody sender 7 and to hold the office line L (step 403). If the call key 13-1 in the operation section 13 is depressed in this state, the controller 10 recognizes the depression of the call key 13-1 in step 405 after step 404. Hence, the controller 10 determines the extension speech communication mode and switches the relay Ry2 to the extension channel 21a side. At the same time, the controller 10 turns on the switch S3 to supply a call signal from the 16-Hz oscillator 4 to the ring tone generator 2-3 of the external TEL 2 (step 406). The ring tone generator 2-3 generates a ring tone based on the input call signal. If the external TEL 2 is set in an off-hook state in response to this ring tone, the off-hook state of the external TEL 2 is recognized in accordance with an output from the DC loop detector 11 in step 407, and the flow advances to the extension speech communication mode (step 408), thereby enabling extension speech communication between the internal and external TELs 1 and 2 (step 408). If transfer of the office line L is informed with respect to the external TEL 2 through the extension speech communication, and the internal TEL 1 is set in an on-hook state, the on-hook state of the internal TEL 1 is recognized in accordance with an output from the hook switch HS3 in step 601 in FIG. 6. Subsequently, the controller 10 determines the external TEL office line mode upon recognition of office line hold by the internal TEL 1 in step 603 after step 602. As a result, external TEL office line processing is performed. That is, the relay Ry3 is switched to the office line channel 20 side (step 604), and at the same time the relay Ry4 is switched to the office line channel 20 side (step 605). The flow then advances to the "external TEL office line mode" (step 606) so as to enable office line speech communication by means of the external TEL 2.

Note that if the internal TEL 1 is set in an on-hook state in step 404 in FIG. 4, the relay Ry3 is switched to the office line channel 20 side so as to branch-connect the internal and external TELs 1 and 2 to the office line L (step 409). Such a case may occur if a callee who receives an incoming call from the office line L through the internal TEL moves to the external TEL 2 to perform speech communication through the external TEL 2, or the callee leaves the internal TEL 1 to find out some data or the like and resumes speech communication through the internal TEL 1. In the former case, since the external TEL 2 is set in an off-hook state, the controller 10 determines the external TEL office line mode upon recognition of the off-hook state of the external TEL 2 in accordance with an output from the DC loop detector 11 in step 410, thereby performing external TEL office line processing. That is, office line hold by the internal TEL 1 is released in step 411, at the same time a privacy function is activated, and the relay Ry2 is switched to the extension channel 21a side to connect the external TEL 2 to the office line L, thereby shifting the flow to the "external TEL office line mode" (step 412). In the latter case, since the internal TEL 1 is set in an off-hook state again, the controller 10 recognizes this off-hook state in accordance with an output from the hook switch HS3 in step 413, and the relay Ry3 is switched to the extension channel 21b side to release the branch connection (step 414). If the hold key 13-2 is depressed again, the depression of the hold key 13-2 is recognized in step 415. Subsequently, office line hold by the internal TEL 1 is released (step 416), and speech communication is restored between the internal TEL 1 and the office line L with the privacy state with respect to the external TEL 2 being assured.

Even if the hold key 13-2 is depressed in step 415 without depressing the call key 13-1 in step 405 during the on-hook state of the internal TEL 1, the office line hold by the internal TEL 1 is released, and speech communication can be restored between the internal TEL 1 and the office line L with the privacy state with respect to the external TEL 2 being assured in the same manner as described above.

If the external TEL 2 is not set in an off-hook state in step 407 in FIG. 4, after re-depression of the call key 13-1 is recognized in step 417, the switch S3 is turned off so as to interrupt output of the call signal to the external TEL 2 (step 419), and the flow returns to step 404. In addition, if the internal TEL 1 is set in an on-hook state without depressing the call key 13-1 in step 417, the flow returns to step 404 through step 419 in the same manner as described above. If the internal TEL 1 is set in an on-hook state in step 401, the idle mode is determined, and the flow returns to the idle state.

An office line transfer operation from the external TEL 2 to the internal TEL 1 will be described below.

When an incoming signal is supplied from the office line L through the relay Ry1, the controller 10 recognizes the incoming signal through the incoming signal detector 9. Then, the relay Ry3 is switched to the office line channel 20 side in the initial state shown in FIG. 1. More specifically, the internal and external TELs 1 and 2 are branch-connected to the office line L, and hence the ring tone generators 1-3 and 2-3 respectively generate ring tones based on the incoming signal. If the external TEL 2 is set in an off-hook state in response to this ring tone, the controller 10 recognizes the off-hook state of the external TEL 2 based on the incoming signal from the office line L in accordance with an output from the DC loop detector 11 in step 215 in FIG. 2. As a result, the controller 10 determines the external TEL office line mode and performs external TEL office line processing. That is, the relay Ry2 is switched to the extension channel 21a side to assure a privacy state with respect to the internal TEL 1, and the flow shifts to the "external TEL office line mode" (step 218), thereby enabling speech communication between the external TEL 2 and the office line L. If the "5*key" is depressed in step 314 in FIG. 3, calling from the external TEL 2 to the office line L can be performed, and the flow shifts to the "external TEL office line mode" (step 317), thereby enabling speech communication between the external TEL 2 and the office line L. In addition, if office line transmission from the internal TEL 1 to the external TEL 2 is performed, the flow shifts to the "external TEL office line mode" through step 606 in FIG. 6, thereby enabling speech communication between the external TEL 2 and the office line L.

Figure 5:
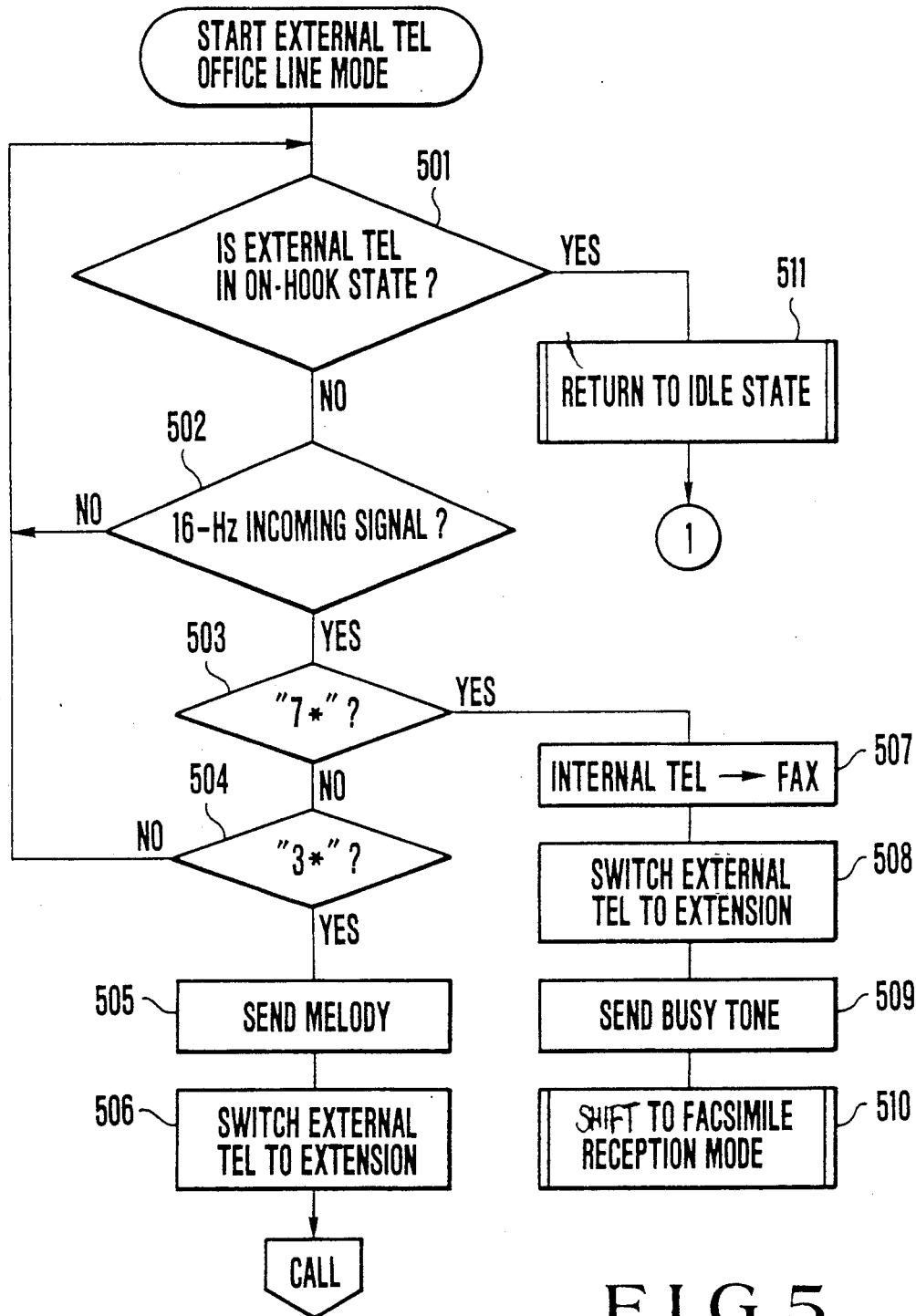
FIG. 5 is a flow chart showing an "external TEL office line mode"

When office line transfer to the internal TEL 1 is to be performed during office line speech communication by means of the external TEL 2, the "3*key" is depressed using the dial key 2-4 of the external TEL 2. FIG. 5 shows an office line transfer operation from the external TEL 2 to the internal TEL 1 in detail. Upon confirmation of the off-hook state of the external TEL 2 (step 501), the controller checks whether office line speech communication by the external TEL 2 is based on an incoming signal from the office line L (step 502). If NO in step 502, i.e., it is determined that the speech communication is based on an outgoing call from the external TEL 2, the flow returns to step 501. That is, if office line speech communication based on an outgoing call from the external TEL 2 is performed, office line transfer to the internal TEL 1 cannot be performed. If the controller 10 determines in step 502 that office line speech communication by the external TEL 2 is based on an incoming call from the office line L, the flow advances to step 503. If the controller 10 recognizes the depression of the "3*key" through the PB receiver 12 in step 504 after step 503, the extension speech communication mode is determined, and extension speech communication is performed. That is, the relay Ry4 is switched to set an office line hold state by sending a melody from the melody sender 7 to the office line L (step 505), and the relay Ry3 is switched to the extension channel 21b side (step 506) to generate an interruption so as to make an interrupt to step 306. More specifically, if a call signal and a ring back tone are respectively supplied to the internal and external TELs 1 and 2 (steps 306 and 307), and the internal TEL 1 is set in an off-hook state in response to a ring tone from the ring tone generator 1-3, extension speech communication can be performed between the external and internal TELs 2 and 1 in step 310 after step 309. If office line transfer is informed to the internal TEL 1 through this extension speech communication, and the external TEL 2 is set in an on-hook state, the on-hook state of the external TEL 2 is recognized in accordance with an output from the DC loop detector 11 in step 607 in FIG. 6. Subsequently, the controller 10 determines the internal TEL mode upon recognition of office line hold by the external TEL 2 in step 608, and performs internal TEL processing. That is, the relay Ry2 is switched to the office line channel 20 side (step 609), and the relay Ry4 is switched to interrupt output of the melody from the melody sender 7 and release the office line hold (step 610). In addition, the switch S1 is turned on to send a busy tone (indicating a telephone line is used) to the external TEL 2 (step 611), and the flow shifts to the "internal TEL mode" (step 612) so as to enable speech communication between the internal TEL 1 and the office line L. The busy tone is sent to the external TEL 2 in step 611 so as to inform that office line speech communication is being performed between the external and internal TELs 2 and 1 when the external TEL 2 is set in an off-hook state.

If a facsimile signal (e.g., a signal for a sound "pi:") is received from the office line L through the external TEL 2, a remote incoming call can be performed by depressing a "7*key" of the dial key 2-4. More specifically, if the "3*key" is depressed in step 503 instead of depressing the "3*key" in step 504, the controller 10 recognizes a remote incoming call mode, i.e., a facsimile reception mode and controls the relay Ry1 so as to switch the office line L to the facsimile main body side, i.e., the modem 6 side (step 507). At the same time, the controller 10 switches the relay Ry3 to the extension channel 21b side (step 508) and turns on the switch S1 to supply a busy tone from the 400-Hz oscillator 5 to the external TEL 2 (step 509). Subsequently, the flow shifts to facsimile reception processing (step 510), thus controlling the CCD head controller 14 to record an image based on a received image signal on recording paper.

Figure 6:
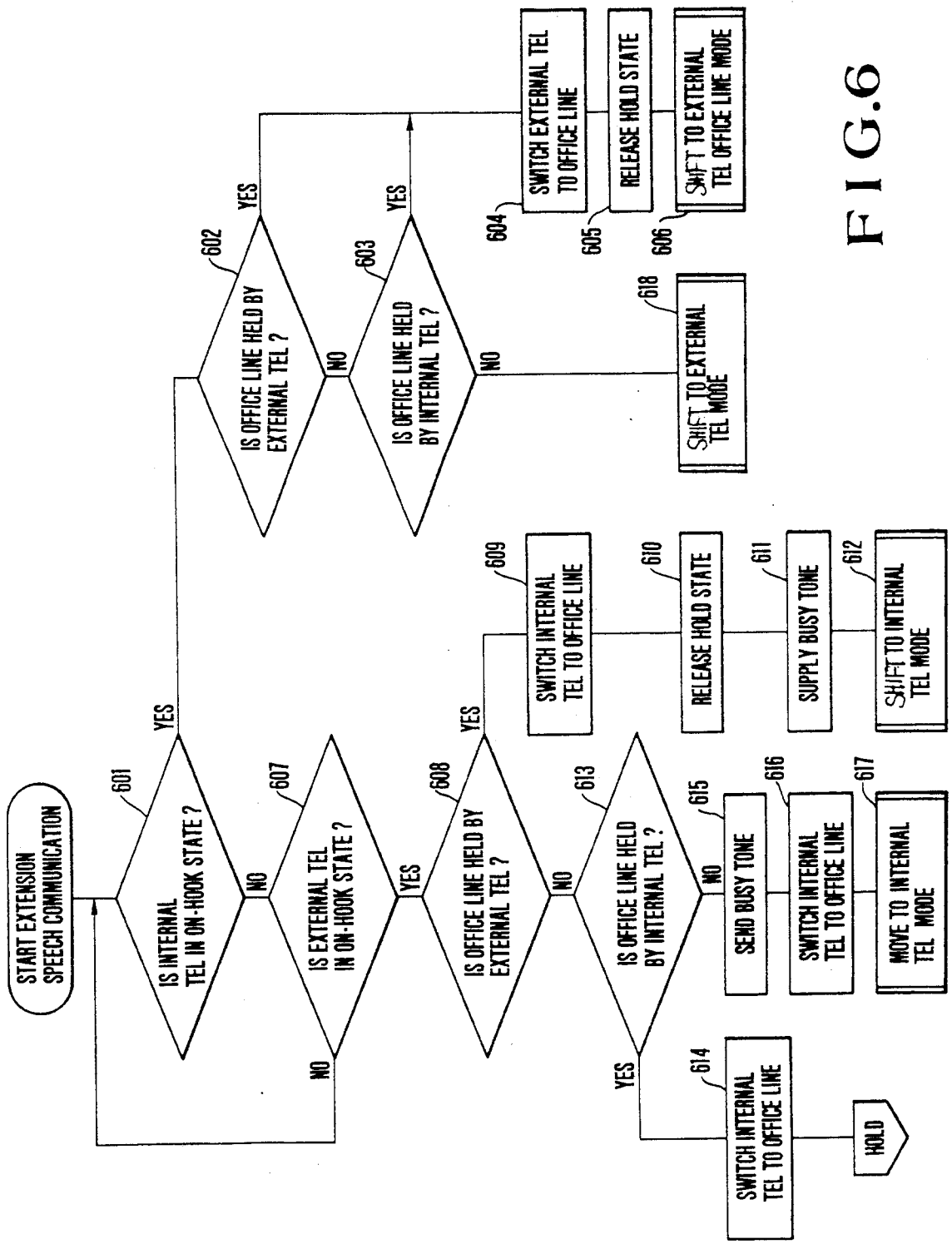
FIG. 6 is a flow chart showing an "extension speech communication mode"

If the internal TEL 1 is set in an on-hook state during extension speech communication between the external and internal TELs 2 and 1 with the office line being held by the external TEL 2, the on-hook state of the internal TEL 1 is recognized in step 601 in the "extension speech communication mode" in FIG. 6, and the flow advances to step 602. If the office line hold state of the external TEL 2 is recognized in step 602, the external TEL office line mode is determined and external TEL office line processing is performed. More specifically, the external TEL 2 is switched to the office line channel 20 side so as to release the office line hold state of the external TEL 2 in steps 604 and 605, and at the same time the internal TEL 1 is switched to the extension channel side 21a side to shift to the "external TEL office line mode". In addition, if the internal TEL 1 is set in an on-hook state during extension speech communication between the external and internal TELs 2 and 1 while the office line is not held by the external TEL 2, the external TEL mode is determined through steps 601, 602, and 603 and external TEL processing is performed. That is, the internal TEL 1 is switched to the extension channel 21a side, and the external TEL 2 is switched to the office line channel 20 side, thereby shifting the flow to the "external TEL mode".

In contrast to this, if the external TEL 2 is set in an on-hook state during extension speech communication between the internal and external TELs 1 and 2 with the internal TEL 1 holding the office line, the flow advances to step 613 through step 608. Upon confirmation of the office line hold state of the internal TEL 1 in step 613, the controller 10 determines the internal TEL mode, and performs internal TEL processing. More specifically, the external TEL 2 is switched to the extension channel 21a side, and the internal TEL 1 is switched to the office line channel 20 side (step 614). Subsequently, the flow jumps to step 404 for the "internal TEL mode" in FIG. 4. If the external TEL 2 is set in an on-hook state during extension speech communication between the internal and external TELs 1 and 2 while the office line is not held by the internal TEL 1, the internal TEL mode is determined, and hence internal TEL processing is performed. More specifically, the external TEL 2 is switched to the extension channel 21b side, and a busy tone is supplied to the internal TEL 1 (step 615). The internal TEL 1 is then switched to the office line channel 20 side (step 616), and the flow shifts to the "internal TEL mode" (step 617).

Note that calling from the internal TEL 1 to the external TEL 2 may be performed on the basis of depression of the call key 13-1 after the internal TEL 1 is set in an off-hook state. In addition, calling from the external TEL 2 to the internal TEL 1 may be performed on the basis of depression of the "3*key" of the dial key 2-4 upon an off-hook operation of the external TEL 2. In this manner, various modifications may be made.

In order to perform calling from the internal TEL 1 (external TEL 2) to the external TEL 2 (internal TEL 1), the ring back tone generator 2-3 (1-3) is arranged in at least the external TEL 2 (internal TEL 1) but need not be arranged in the internal TEL 1 (external TEL 2).

In the above-described embodiment, the external TEL 2 is assumed to be a PB telephone set (push button type (DTMF type)). However, a DP telephone set can be controlled in the same manner as described above.

As has been described above, in the facsimile apparatus of the present invention, according to the first aspect, the internal telephone set is switched to the extension channel side and the external telephone set is called in accordance with depression of the call key and an off-hook operation of the internal telephone set. If the external telephone set is set in an off-hook state in response to this calling, a channel is formed between the external and internal telephone sets. According to the second aspect of the present invention, the internal telephone set is switched to the extension channel side and the internal telephone set is called in accordance with a calling operation of the external telephone set with respect to the internal telephone set. If the internal telephone set is set in an off-hook state in response to this calling, a channel is formed between the internal and external telephone sets. As a result, while a privacy function is assured between the internal and external telephone sets, extension speech communication can be performed between the internal and external telephone sets.

According to the third aspect of the present invention, when a dial signal which is sent in accordance with the dial key operated on the basis of facsimile communication from the external telephone set to the facsimile main body is detected, the office line is switched to be connected to the facsimile main body. As a result, incoming call transfer for facsimile communication, i.e., a remote incoming call can be performed by means of the external telephone set in addition to the effects in the second aspect.

What is claimed is:

1. A facsimile apparatus which is selectively connected to an office line together with an external telephone set having a ring tone generator and is constituted by an internal telephone set and a facsimile main body, comprising:

an extension channel for connecting said external and internal telephone sets to each other;

an office line channel for connecting said external and internal telephone sets to said office line;

a call key for calling said external telephone set;

a call signal generator for outputting a call signal to said ring tone generator;

first switching means for switching said office line to one of said facsimile main body and said office line channel;

second switching means for normally connecting said internal telephone set to said office line channel;

third switching means for normally connecting said external telephone set to said extension channel and switching said external telephone set to said office line channel in accordance with an office line outgoing call request and an office incoming call of said external telephone set; and a control section for controlling said second switching means so as to switch said internal telephone set from the office line channel side to the extension channel side in accordance with depression of said call key and an off-hook operation of said internal telephone set and for controlling said call signal generator so as to output a call signal to said ring tone generator in accordance with depression of said call key and said off-hook operation, wherein a channel is formed between said external and internal telephone sets by setting said external telephone set in an off-hook state in response to said call signal.

2. A facsimile apparatus which is selectively connected to an office line together with an external telephone set having a dial key and is constituted by an internal telephone set having a ring tone generator and a facsimile main body, comprising:
- an extension channel for connecting said external telephone set to said internal telephone set;
- an office line channel for connecting said external and internal telephone sets to said office line;
- a call signal generator for outputting a call signal to said ring tone generator;
- first switching means for switching and connecting said office line to one of said facsimile main body and said office line channel;
- second switching means for normally connecting said internal telephone set to said office line channel;
- third switching means for normally connecting said external telephone set to said extension channel and switching and connecting said external telephone set to said office line channel in accordance with an office line call request and an office line incoming call of said external telephone set; and
- a control section for controlling said second switching means so as to switch said internal telephone set to said extension channel in accordance with a calling operation of said external telephone set with respect to said internal telephone set and for controlling said call signal generator so as to output a call signal to said ring tone generator of said internal telephone set in accordance with said calling operation, wherein
- a channel is formed between said internal and external telephone sets by setting said internal telephone set in an off-hook state in response to said call signal.

3. An apparatus according to claim 2, further comprising a detector for detecting a dial signal sent in accordance with said dial key which is operated in accordance with calling from said external telephone set to said internal telephone set and office incoming call transfer based on facsimile communication to said facsimile main body, said control section controlling said second switching means so as to switch said internal telephone set to the extension side and controlling said call signal generator so as to output a call signal to said ring tone generator of said internal telephone set when said detector detects calling to said internal telephone set, and said control section controlling said first switching means so as to switch said office line to said facsimile main body when said detector detects office line incoming call transfer.

* * * * *